July 24, 1962
C. R. BRANDT
3,045,489
COMPENSATING APPARATUS
Filed March 2, 1959
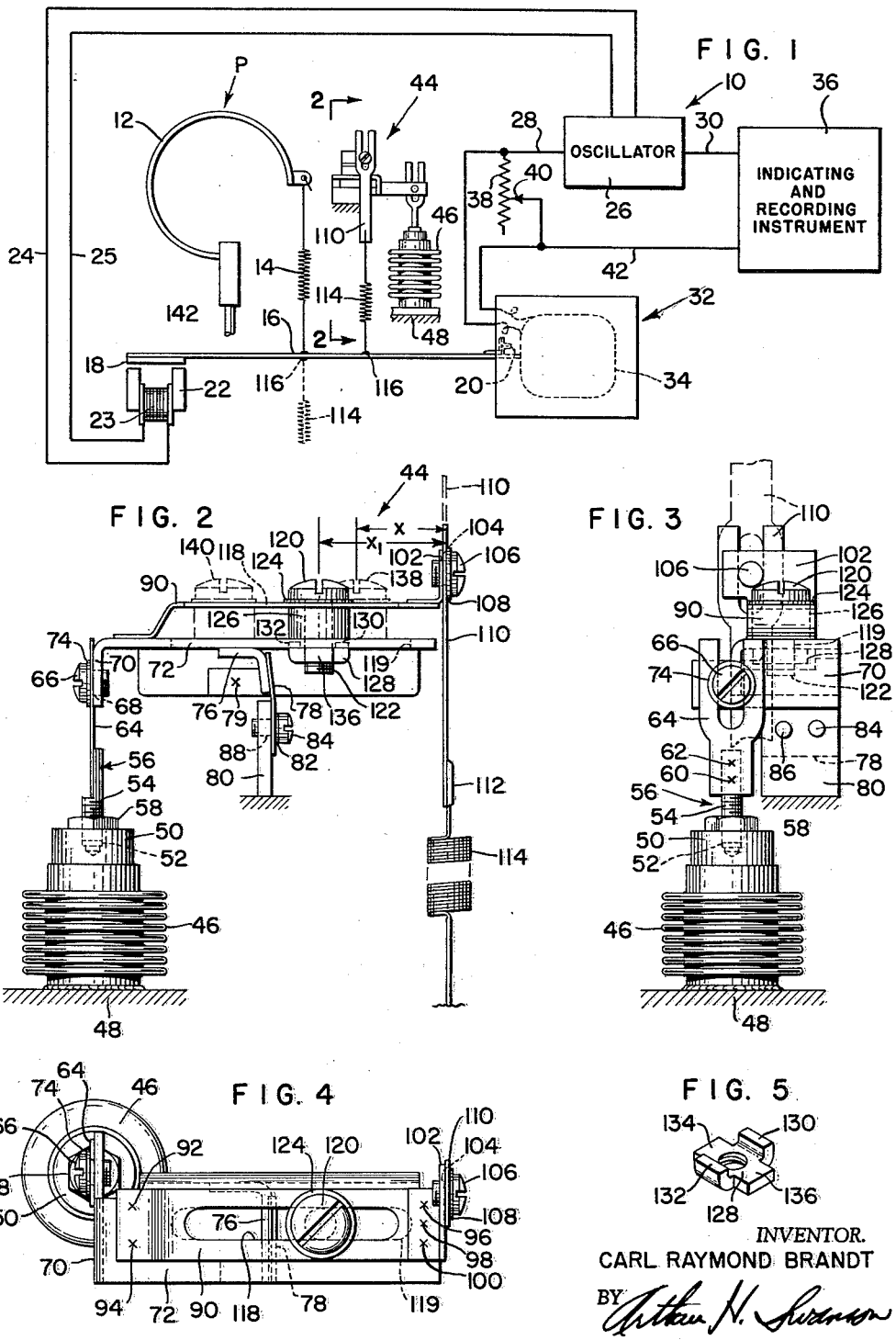
INVENTOR.
CARL RAYMOND BRANDT
BY
ATTORNEY.

United States Patent Office 3,045,489
Patented July 24, 1962

3,045,489
COMPENSATING APPARATUS
Carl Raymond Brandt, Oreland, Pa., assignor to Minneapolis-Honeywell Regulator Company, Minneapolis, Minn., a corporation of Delaware
Filed Mar. 2, 1959, Ser. No. 796,685
10 Claims. (Cl. 73—393)

The general object of the present invention is to disclose an adjustable ambient pressure compensating apparatus that is useful in completely negating the adverse expansion and contraction effect that atmospheric pressure changes have on fluid pressure actuated elements.

More specifically, another object of the present invention is to provide an improved ambient pressure compensating apparatus of the aforementioned type for use with a pressure to force or pressure to motion transforming apparatus that is employed for example as an input element in a force balance system or in a motion transmitting system.

It is still another object of the present invention to employ an apparatus of the aforementioned type which will instantaneously negate the effect that any atmospheric pressure change will have on a pressure to force transforming apparatus when such a transforming apparatus is being used in an atmospheric pressure controlled chamber such as is employed in the testing of jet engines in a wind tunnel chamber.

A still more specific object of the present invention is to employ the aforementioned adjustable compensating apparatus to simultaneously negate any undesired force that a bourdon or any other pressure distensible member is transmitting to a force balance beam as a result of changes in the atmospheric pressure surrounding the external surface of such a distensible member.

Still another object of the present invention is to provide an ambient pressure compensating apparatus whose parts do not have to be manufactured with a fine degree of accuracy and which apparatus can be readily adjusted to select a desired gradient to match the gradient of the distensible element whose ambient pressure it is employed to compensate in a very precise manner.

A better understanding of the present invention may be had from the following detailed description when read in connection with the accompanying drawing in which:

FIG. 1 shows how the ambient pressure compensating apparatus disclosed in this specification may be connected to a displacement transducer that is being used in a force balance system;

FIG. 2 shows in solid line form an assembly view of the parts of the ambient pressure compensating apparatus which view is taken along the lines 2—2 of FIG. 1 as well as a dotted line position to which a coiled spring of this apparatus can be rotated when it is desired to connect the apparatus to the underside of the force balance beam that is shown in FIG. 1;

FIG. 3 shows a left end elevation view of the compensating apparatus that is shown in FIG. 2;

FIG. 4 shows a top plan view of the compensating apparatus that is shown in FIG. 2 and FIG. 5 shows a detail of a nut used in the compensating apparatus that is shown in FIG. 2.

FIG. 1 of the drawing shows a schematic form of the pressure to current type of force balance system 10 having a displaceable transducer to which the ambient pressure compensating apparatus disclosed in this application can be attached.

This force balance system shown in FIG. 1 is representative of numerous types of measuring apparatus that employ the principle of using a variable to produce a reaction force upon a pivoted beam with the force being force balanced by a suitable feedback force producing device.

The system shown in FIG. 1 may, for example, employ a force balance displaceable transducer which is similar to the type disclosed in the Philip E. Shafer application, Serial No. 433,505 filed June 1, 1954, now Patent No. 2,847,619.

This particular force balance system 10 shown in FIG. 1 is comprised of a distensible member such as a Bourdon tube 12 to the interior of which a fluid pressure of a varying magnitude is applied to displace the free end of the bourdon in an upward or downward direction. FIG. 1 also shows a spring 14 through which a force can be applied to a pivoted beam 16 when force is directly proportional to any change in pressure that occurs within the bourdon 12.

In a motion transmitting system in which the beam member 16 is a movable member to which it is desired to apply the direct effect of the displacement of the bourdon, rather than the application of a force resulting from this displacement by means of the spring 14, then a direct connection without this spring 14, is made between the free end of the bourdon and the beam member.

The resulting deflection of the beam 16 causes the plate 18 attached thereto to be rotated about a torsional angle pivot 20 relative to an iron core 22 that has a coil 23 wound thereon. This coil 22 is connected by electrical leads 24, 25 to the oscillator 26. The coil 23 is used to vary the impedance of the feedback path of the oscillator 26, which has the coil on the input thereof and this coil 23 controls the amplitude of the oscillations and the D.C. current output. The magnitude of output current of the oscillator 26 is proportional to the motion of the member 18 relative to the coil 23. Its output current flowing in leads 28 and 30 will be proportional to the magnitude of the pressure in the Bourdon tube.

The output current flow is used to force balance the pivoted beam 16 by means of a force balancing unit 32. This unit includes a coil 34 surrounded by permanent magnet units, not shown, for creating a magnetic field as is disclosed in detail in the aforementioned Shafer patent application. This unit 32 utilizes the coil 34 that is attached to one end of the beam as a means for force balancing the beam. The output current flows to a suitable indicating and recording instrument shown generally as 36.

In considering the operation of the force balance apparatus of FIG. 1 it will be noted that with a particular fluid pressure in the Bourdon tube there will be a predetermined force applied through the spring 14 to displace the pivoted beam 16 and member 18 fixedly attached thereto. This displacement of the beam 16 and its associated member 18 attached thereto is detected by the coil 23 and the oscillator 26 will have an output current proportional to this deflection. The output current of the oscillator 26 will pass through the force balancing pancake shaped coil 34 of the unit 32 which, acting directly on the right end of the beam 16, will provide a balancing force for this beam 16 so that the resultant current flow in the output leads 28 and 30 passing into the indicating instrument 36 will be proportional to the magnitude of the fluid pressure in the bourdon 12.

From the above description of the forces acting on the beam 16 it should thus be readily apparent that the position that the member 18 will be located in, at any one instant of time, will be determined by the difference that is then present between the force of spring 14 acting on the beam 4 due to the displacement of bourdon 12 less the amount of this force that is bucked out by the force balancing current acting on the pancake coil 34.

The characteristics of the unit 32 is such that it will produce a high output torque through a relatively small angle and thus provide a high balancing force for the pivoted beam 16 while the actual motion of the beam is very small.

The force balance system shown in FIG. 1 may also include a span adjusting means in the form of a suitable potentiometer 38 and a slider 40 shown located between the electrical leads 28 and 42. This potentiometer 38 and slider 40 may be used to adjust the span of the aforementioned described force balance unit in the same manner as that disclosed in the Modie application, Serial No. 487,882 filed Feb. 14, 1955, now Patent No. 2,950,054.

As has been previously noted the present invention is concerned with the provisions of an ambient pressure compensating apparatus for a force balance system such as the aforementioned described force balance system shown in FIG. 1. The description which follows covers the description of such an ambient pressure compensating apparatus which is identified in the drawing by reference character 44.

This ambient pressure compensating apparatus 44 is comprised of an evacuated bellows 46 which is fixedly attached at one end to a stationary member 48. The other or top end of the bellows 46 has a cylindrical member 50 soldered thereto which projects in an upward direction. This member 50 has a tapped hole 52 at a central portion to which the lower end of stud 54 of fork member 56 is threadedly attached for adjustment. The portion of the stud 54 is shown fixedly retained by a nut 58 which is in surface to surface contact with the upper surface of member 50. The upper end of the stud member 54 is split in half as shown and spot welded at 60, 62 to a thin flexible fork shaped plate 64.

FIGS. 2 and 3 show the upper right and left portions of the fork shaped plate 64 being retained by means of a screw 66 which is threadedly engaged with the portion 68 of a tapped hole in a bent left end portion 70 of the beam 72. A washer 74 is used under the head of the screw 66 to retain the plate 64 in a fixed position with respect to the left end 70 of the beam 72. This screw connection is made after the beam 72 and a bent angle bar 76 fixedly attached thereto and the upper portion of the spring plate pivot 78 have been rotated in a counter clockwise direction to the bent spring plate pivot position shown. Such an arrangement thus enables the bellows to be preloaded by applying a predeterminable spring force thereto.

The lower end of the spring plate 78 is shown retained in a fixed position against a stationary member 80 by means of a washer 82 and the screws 84, 86 are each threadedly connected in the manner as shown for example at 88 in FIG. 2 to this stationary member 80.

To the upper end of the beam 72 there is shown a thin flexible spring plate 90 that is spot welded to the beam at 92, 94 at one of its ends and similarly welded at 96, 98, 100 at its other end to a bent angle plate 102.

The angle plate 102 contains a tapped hole 104 into which a round head screw 106 which carries a washer 108 is threadedly engaged. The under side of the head of the screw is shown in a position that presses the washer 108 and a thin forked plate 110 against the right surface of angle plate 102. The lower end of the forked plate 110 is connected by welding material at 112 to the upper end of a coil spring 114. The lower end 116 of the spring 114 is connected as shown in FIG. 1 to the force balance beam 16.

As shown in FIG. 4 a slot 118 is formed by the inner wall portion of the spring plate 90. In FIG. 2 a screw 120 is shown threaded at its lower end 122 and passing through the slot 118, slot 119 in beam 72 that is immediately below slot 118, the washer 124 and a sleeve 126. Threadedly mounted on the lower end of the screw 120 there is a nut 128 which is shown in detail in FIG. 5. This nut 128 has two projecting lug portions 130, 132 which are shown in FIG. 2 projecting up through the slotted wall portions 119 of the beam 72 which wall portion prevents the nut from being rotated. The nut 128 also has two flat portions 134, 136 which are laterally positioned to engage underside portions of the beam 72 that are on opposite sides of the slot 119 when the screw 120 has been tightened in a clockwise direction.

When the screw 120 is rotated a small distance in the counter clockwise direction it can be seen that the entire screw nut and sleeve assembly can be slid along the beam 72 and spring plate 90 either for example to the dotted line position 138 that is shown to the right of its solid line position or to the dotted line position 140 that is shown to the left of the solid line position of this screw 120.

It is evident from the aforementioned description of the adjustable screw elements that the gradient which the ambient pressure compensating apparatus 44 introduces into the force balance beam system is changed by adjusting the position of the screw 120 along the beam 72.

If the screw 120 as shown in FIG. 2 and FIG. 4 is moved to and secured at the extreme right end position of the slots 118, 119 then the gradient that will be introduced will depend on the gradient of the spring 114 and the parts connecting 110 to 90. The spring 114 will thus transform any expansion or contraction that takes place in the preloaded evacuated bellows 46 which is due to changes in the pressure of the medium surrounding this bellows into a force that is proportional to the expansion or contraction which force is applied to the force balance beam 16.

If on the other hand the screw 120 is moved and secured in the dotted line position 138 then the gradient which will be introduced into the force balance beam will be due to both the gradient of spring 114 plus the gradient of that length X of the plate 90 through which screw 120 has been moved along the beam 72 and spring plate 90 from the vertical axis on which the spring 114 is applying its force to the force balance beam 16 and 116.

It can thus be seen that the screw 120 can be moved further to the left along the beam 72 and spring plate 90 such as shown in the solid line portion of the screw or still further to its dotted line position 140 which is immediately to the left of the solid line position.

When the screw is fixedly attached in the solid line position 130 the gradient that the ambient pressure compensating apparatus 44 will introduce into the force balance beam system will be due to the gradient of spring 114 plus the gradient of that length $X_1$ of the plate 90 between the screw 120 and the vertical axis on which the spring 114 is applying its force to the force balance beam 16 at 116.

From the aforementioned description of the operation of the ambient pressure compensating apparatus it can be seen that the spring gradient of this apparatus can be adjusted so that the change in torque which spring 114 will apply to the force balance beam 16 will exactly match but be in an opposite direction to the change in torque that the spring 14 is applying to the beam 16 as changes occur in the pressure P surrounding the bourdon 12.

If for example the ambient pressure P, or in other words the pressure surrounding the bourdon, increases from any given pressure level then this increase will prevent the bourdon from being expanded to a position it would have expanded to if this ambient pressure increase had not occurred. As a result of this ambient pressure increase the bourdon can not apply the full amount of torque to the force balance beam 16 that it is supposed to apply as the fluid pressure being applied through the conduit 142 is varied over the pressure range for which the bourdon 12 is designed.

By securing the screw 120 tightly to the beam 72 and flexible strip 90 in a position which will provide the desired gradient as explained supra then the increased ambient pressure that is acting on the evacuated bellows will cause the bellows to be compressed slightly. As this compression takes place the fork member 56 and the left end of the beam 72 attached thereto will simultaneously move in a downward direction. As this motion occurs the right end of the beam 72 will be rotated about the pivot 78 in an upward direction and an increase displacement in an upward direction will be simultaneously applied by the right end of the plate 90 to the upper end 110 of the spring 114. The displacement applied to the upper end of the spring 114 in this manner will cause the lower end of the spring to thus apply a force to the force balance beam 16 which is proportional to the increase in ambient pressure that caused the bellows 46 to be compressed.

The arrangement is such that the amount of increased torque that is applied to the force balance beam 16 in an upward direction by the end 116 of spring 114 will be exactly equal to and acting simultaneously with the amount of torque which the ambient pressure P causes bourdon 12 to decrease before it is applied to the force balance beam 16 by way of spring 14. No net resulting torque will thus be applied to the beam when such an increase in ambient pressure occurs due to the presence of the ambient pressure compensating apparatus 44 which increases the torque it is applying to the beam 16 in an upward direction by the exact amount of torque which the ambient pressure changes causes the bourdon to apply to the force balance beam in a downward direction.

In a similar but opposite manner to that already described it should be noted that when the ambient pressure P is decreased from any given pressure level then the force which the bourdon 12 will transmit through this spring 14 to the beam 16 will be caused to increase. As this adverse increase in force is being applied to the force balance beam 16 an expansion of the preloaded evacuated bellows 46 also occurs which will cause the beam 72 to be rotated on its pivot plate 78 in a clockwise direction to that shown in FIG. 2. This action in turn will reduce the force that the lower end 116 of the spring 114 is permitted to apply to the force balance beam 16 so that the increase in torque that the bourdon 12 is applying to beam 16 due to ambient pressure will be neutralized by the exact amount by which the evacuated bellows and spring gradient of the ambient pressure compensating means is able to lessen the torque it is applying to the beam 16 by way of the end 116 of the spring 114.

It should also be understood that if the ambient pressure compensating apparatus is placed in a position such as that shown in FIG. 2 and the spring 114 and fork member 110 attached thereto is moved one hundred and eighty degrees from the solid line position shown for these two elements, or in other words to the dotted line position and retained in this position by the screw 106 then the free end 116 of the spring 114 can be connected to the force balance beam 16 at a position immediately below the point at which the lower end of the spring 14 is applying its force to the beam 16.

With the ambient pressure compensating apparatus in this position this apparatus can be adjusted in the same manner as that previously described so that the change in torque which spring 114 will apply to the force balance beam 16 will exactly match but be in a direct opposite direction to the change in torque that the spring 14 is applying to the beam 16 as changes occur in the pressure P surrounding the bourdon 12.

The apparatus disclosed herein thus provides an ambient pressure compensating means whose gradient can be adjusted to match the gradient of a bourdon so that the change in torque it can apply to a movable member such as a beam of a force balance system will under all force applying conditions of the bourden be exactly equal but opposite to the torque that the bourdon applies to this member due to increased or decreased changes in the magnitude of pressure being applied to the external surface of the bourdon.

What is claimed is:

1. An ambient pressure compensating means for a force balance system wherein said system has a force balanced beam provided with any selected one of a number of different size input members that is subjected to an ambient pressure of varying magnitude connected to apply a force in one direction or another to said force balance beam, said compensating means comprising an evacuated bellows that is subject to expansion upon a decrease in said ambient pressure and subject to contraction upon an increase in said ambient pressure, said compensating means being further comprised of a pivoted beam, a connection between one end of said pivoted beam and said bellows, a flexible spring plate fixedly connected at one end to said one end of said pivoted beam and extending in an unconnected spaced parallel relationship with the elongated axis of said pivoted beam, a second spring connected at one end to the other unconnected end of said flexible spring plate and being connected to said force balance beam at its other end to apply a force thereto in an opposite direction to said force being applied by said input member and a slideable screw and nut connection operably adjustable along said pivoted beam and said spring plate to any one of a plurality of fixed positions to decrease or increase the magnitude of the force that said bellows transmits through said pivoted beam, spring plate and spring to said force balance beam to a value that will exactly cancel out the force due to changes in ambient pressure being transmitted to said force balance beam by any one of said selected input members.

2. An ambient pressure compensating means for a force balance system wherein said system has a force balanced beam provided with any selected one of a number of different size input members that is subjected to an ambient pressure of varying magnitude connected to apply a force in one direction or another to said force balance beam, said compensating means comprising an evacuated bellows that is subject to expansion upon a decrease in said ambient pressure and subject to contraction upon an increase in said ambient pressure, a pivoted beam, a connection between one end of said pivoted beam and said bellows, a flexible spring plate fixedly connected at one end to said one end of said pivoted beam and extending in an unconnected spaced parallel relationship with the elongated axis of said pivoted beam, a second spring connected at one end to the other end of said flexible spring plate and being connected to said force balance beam at its other end to apply a reduction in force thereto in the same direction as said force being applied by said input member, and a slideable screw and nut connection operably adjustable along said pivoted beam and said spring plate to any one of a plurality of positions to decrease the magnitude of the force that said bellows transmits through said pivoted beam and spring plate connected thereto by way of said spring to said force balance beam to thereby exactly cancel out the force due to ambient pressure being transmitted to said force balance beam by any one of said selected input members.

3. An adjustable ambient pressure compensating means to substantially negate the effect that a change in ambient pressure has on any selected one of a number of different size input elements that is applying a force to a force balance beam, comprising a pivoted beam, an evacuated bellows having a stationary end and an end that is movable in response to changes occurring in said ambient pressure that is in contact with said pivoted beam, an adjustably fixed link connection between said movable end of said bellows and one end of said pivoted beam, an elongated spring plate having one end connected to the top of said one end of said pivoted beam and having another end adjacent and spaced from the other end of said pivoted beam connected to one end of a coil spring, said other end of said coil spring being operably connected to said force balance beam to apply a torque thereto which is equal but in a direct opposite direction to the torque applied by said selected input member and a slidable screw and nut connection operably adjustable along said pivoted beam and said spring plate to any one of a plurality of positions to alter the magnitude of force that the bellows transmits through said pivoted beam and spring plate connected thereto by way of said coil spring to the force balance beam.

4. An ambient pressure compensating apparatus for any selected one of a number of different size pressure-distensible members that is operably connected to apply a torque of varying magnitude to a force balance beam member, said compensating apparatus comprising an evacuated bellows having a stationary end and an end that is movable in response to changes occurring in said ambient pressure that is being applied to the outer surface of said bellows, a pivoted beam operably connected to said bellows at one end for movement about a stationary pivot, a resilient connection between the other end of said pivoted beam and a spring member that has an extended end connected to apply a force to said force balance beam and a movable slider and screw connection between said pivoted beam and said resilient connection for varying the spring gradient of said spring member to alter the torque that said compensating apparatus can apply through said resilient connection to said force balance beam member by way of said spring member to a value that will exactly cancel out the torque due to changes in ambient pressure being transmitted to said force balance beam by any one of said selected pressure distensible members.

5. An ambient pressure compensating apparatus to substantially negate the adverse effect that the change in ambient pressure has on the torque that any selected one of a number of different size pressure distensible members is transmitting to a movable beam member, comprising an evacuated member that is operably connected to said beam member by way of a displaceable flexible spring plate to apply a torque to said beam that is in an opposite direction to said torque being applied to said beam by said distensible member, a pivoted beam, a slidable screw and nut connection between said spring plate member and the pivoted beam, and said slidable screw and nut connection being operable to adjust the spring gradient of said flexible spring plate to enable said torque introduced by said evacuated member that is being transmitted to said beam member to apply substantially the exact magnitude of said torque through said flexible spring plate to said beam that said change in ambient pressure has caused said selected distensible member to apply to said beam.

6. An ambient pressure compensating means for a force balance system wherein said system is provided with a force balanced beam and any selected one of a number of different size input members that is subjected to an ambient pressure of varying magnitude connected to apply a force in one direction or another to said force balance beam, said compensating means comprising an evacuated bellows that is subject to expansion upon an decrease in said ambient pressure and subject to contraction upon an increase in said ambient pressure, a pivoted beam, a connection between one end of said pivoted beam and said bellows, a flexible spring plate connected at one end to said one end of said pivoted beam and extending in spaced parallel relationship with said pivoted beam a slidable screw and nut connection between said flexible spring plate and said pivoted beam and a spring connected at one end to the other end of said flexible spring plate and connected at its other end to said force balance beam to apply a force thereto in an opposite direction to said force being applied by said selected input member.

7. An ambient pressure compensating means for a force balance system wherein said system is provided with a force balanced beam and any selected one of a number of different size input members that is subjected to an ambient pressure of varying magnitude connected to apply a force in one direction or another to said force balance beam, said compensating means comprising an evacuated bellows that is subject to expansion upon a decrease in said ambient pressure and subject to contraction upon an increase in said ambient pressure, a pivoted beam, a connection between one end of said pivoted beam and said bellows, a flexible spring plate connected at one end of said pivoted beam and extending in spaced parallel relationship with said last mentioned beam, a spring connected at one end by way of an adjustable screw and slot connection to the other end of said flexible member and connected to said force balance beam at its other end to apply a force thereto in an opposite direction to said force being applied by said selected input member and a slideable screw connection between said pivoted beam and said spring plate to decrease the magnitude of the force that said bellows transmits through said pivoted beam and spring plate connected thereto by way of said spring to said force balance beam.

8. An ambient pressure compensating apparatus to substantially negate the adverse effect that a change in ambient pressure has on the magnitude of force that any selected one of a number of different size pressure distensible members is transmitting to a force balance beam member, comprising an evacuated member, a flexible pivoted spring plate member, said evacuated member being operably connected to said force balance beam member by way of said flexible pivoted spring plate member to apply a force to said beam member that is in an opposite direction to said force being applied to said beam by said distensible member, means to adjust the spring gradient of said flexible spring plate to enable said force of said evacuated member that is being transmitted to said force balance beam member to apply substantially the same exact magnitude of said force through said flexible spring plate member to said beam member that said change in ambient pressure has caused said selected distensible member to apply to said beam member, a pivoted beam, the flexible spring plate being mounted for rotation on one end of the pivoted beam, said means to adjust said spring gradient of said flexible spring plate being comprised of a screw means that is adjustable in aligned slots formed in a wall portion of said pivoted beam and said flexible spring plate, and a clamping means connected with said screw means to retain said pivoted beam and said flexible spring plate fixedly connected to one another at various locations along said pivoted beam and said flexible spring plate.

9. An ambient pressure compensating apparatus to substantially negate the adverse effect that the change in ambient pressure has on the displacement that any selected one of a number of different size pressure distensible members is transmitting to a movable beam member, comprising a flexible pivoted spring plate member, an evacuated member operably connected to said beam member by way of the pivoted spring plate member to apply a displacement to said beam that is in an opposite direction to said displacement being applied to said beam by said distensible member, a pivoted beam, a slidable screw and nut connection between said spring plate member and the pivoted beam, and said slidable screw and nut connection being operable to adjust the spring gradient of said flexible spring plate member and to enable said displacement of said evacuated member that is being transmitted to said beam to apply substantially the same exact magnitude of said displacement through said flexible spring plate member to said beam that said change in ambient pressure has caused said selected distensible member to apply to said beam.

10. An ambient pressure compensating apparatus to substantially negate the adverse effect that the change in ambient pressure has on the displacement that any selected one of a number of different size pressure distensible members is transmitting to a movable beam member, comprising an evacuated member that is operably connected to said beam member by way of a flexible pivoted spring plate member to apply a displacement to said beam that is in an opposite direction to said displacement being applied to said beam by said distensible member and to adjust the spring gradient of said flexible spring plate member and to enable said displacement of said evacuated member that is being transmitted to said beam to apply substantially the same exact magnitude of said displacement through said flexible spring plate member to said beam that said change in ambient pressure has caused said selected distensible member to apply to said beam, said flexible spring plate being mounted for rotation on one end of a pivoted beam and said means to adjust said spring gradient of said flexible spring plate being comprised of a screw means that is adjustable in aligned slots formed in a wall portion of said pivoted beam and said flexible spring plate, and a clamping means connected with said screw means to retain said pivoted beam and said flexible spring plate fixedly connected to one another at various locations along said pivoted beam and said flexible spring plate.

References Cited in the file of this patent
UNITED STATES PATENTS

| | | |
|---|---|---|
| 1,983,486 | Paulin | Dec. 4, 1934 |
| 2,309,314 | Harshaw | Jan. 26, 1943 |
| 2,325,091 | Allwein et al. | July 27, 1943 |
| 2,379,328 | Weingart | June 26, 1945 |
| 2,502,776 | Burdick | Apr. 4, 1950 |
| 2,744,489 | Gallant | May 8, 1956 |
| 2,849,223 | Rikken | Aug. 26, 1958 |